US010850866B2

(12) United States Patent
Fisher et al.

(10) Patent No.: US 10,850,866 B2
(45) Date of Patent: Dec. 1, 2020

(54) POD COVER SYSTEM FOR A VERTICAL TAKE-OFF AND LANDING (VTOL) UNMANNED AERIAL VEHICLE (UAV)

(71) Applicant: AeroVironment, Inc., Simi Valley, CA (US)

(72) Inventors: Christopher Eugene Fisher, Leo, IN (US); Jason Sidharthadev Mukherjee, Simi Valley, CA (US); William Arden Lott, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

(21) Appl. No.: 15/041,758

(22) Filed: Feb. 11, 2016

(65) Prior Publication Data

US 2017/0021942 A1 Jan. 26, 2017

Related U.S. Application Data

(60) Provisional application No. 62/115,074, filed on Feb. 11, 2015.

(51) Int. Cl.
*B64F 1/00* (2006.01)
*B64C 29/02* (2006.01)
*B64C 39/02* (2006.01)

(52) U.S. Cl.
CPC .............. *B64F 1/005* (2013.01); *B64C 29/02* (2013.01); *B64C 39/024* (2013.01);
(Continued)

(58) Field of Classification Search
CPC ........ B64C 2201/021; B64C 2201/088; B64C 2201/141; B64C 2201/201; B64C 29/02;
(Continued)

(56) References Cited

U.S. PATENT DOCUMENTS 2,151,128 A * 3/1939 Looney ................ B64C 39/00
244/231
2,961,189 A * 11/1960 Doak .................. B64C 29/0033
244/12.4
(Continued)

FOREIGN PATENT DOCUMENTS

JP 2012198883 A 10/2012
WO 2006022654 A1 3/2006
(Continued)

OTHER PUBLICATIONS

European Search Report for EP Application No. 14828680.0 dated Nov. 10, 2016.
(Continued)

*Primary Examiner* — Medhat Badawi
(74) *Attorney, Agent, or Firm* — Concept IP LLP; Michael Zarrabian; Eric Aagaard

(57) ABSTRACT

An unmanned aerial vehicle (UAV) storage and launch system includes a UAV pod having an open position and a closed position, the closed position establishing an interior that is weather resistant to an environment external to the UAV pod and a vertical takeoff and landing (VTOL) UAV enclosed in the UAV pod so that the UAV pod in the closed position provides a weather resistant interior for the VTOL UAV.

21 Claims, 8 Drawing Sheets

(52) U.S. Cl.
CPC .. *B64C 2201/021* (2013.01); *B64C 2201/088* (2013.01); *B64C 2201/141* (2013.01); *B64C 2201/201* (2013.01)

(58) Field of Classification Search
CPC .......... B64C 39/024; B64F 1/005; B64F 1/36; B64F 1/02; B64F 1/04; B64F 1/10; B64F 1/00
See application file for complete search history.

(56) References Cited

U.S. PATENT DOCUMENTS

| | | | | |
|---|---|---|---|---|
| 3,181,810 A * | 5/1965 | Olson | ................ | B64C 29/0033 244/66 |
| 3,527,431 A * | 9/1970 | Wright | ................ | B64D 1/16 244/110 R |
| 4,116,408 A * | 9/1978 | Soloy | ................ | B64F 1/007 244/110 E |
| 4,410,151 A * | 10/1983 | Hoppner | ................ | B64C 39/024 244/120 |
| 4,700,653 A * | 10/1987 | Harris | ................ | B63G 8/32 114/238 |
| 4,814,711 A * | 3/1989 | Olsen | ................ | G01V 1/22 324/331 |
| 5,062,587 A * | 11/1991 | Wernicke | ................ | B64C 25/04 244/100 R |
| 5,289,994 A * | 3/1994 | Del Campo Aguilera | ................ | B64C 27/22 244/12.1 |
| 5,311,436 A * | 5/1994 | Trennel | ................ | F42B 15/36 700/117 |
| 5,419,514 A * | 5/1995 | Ducan | ................ | B64C 29/0033 244/12.4 |
| 5,577,687 A * | 11/1996 | Downing | ................ | B64F 1/007 244/110 E |
| 5,765,783 A * | 6/1998 | Albion | ................ | B64C 29/02 244/17.23 |
| 5,950,372 A * | 9/1999 | Al-Sabah | ................ | F41F 3/04 52/66 |
| 6,056,237 A * | 5/2000 | Woodland | ................ | B64C 3/40 244/120 |
| 6,079,668 A * | 6/2000 | Brown | ................ | B64F 1/007 244/110 E |
| 6,229,299 B1 * | 5/2001 | Strashny | ................ | G01P 3/487 324/165 |
| 6,371,410 B1 * | 4/2002 | Cairo-Iocco | ................ | B64C 25/30 244/100 A |
| 6,467,726 B1 | 10/2002 | Hosoda | | |
| 6,868,314 B1 | 3/2005 | Frink | | |
| 7,299,925 B1 * | 11/2007 | Ansay | ................ | B65D 81/052 206/522 |
| 7,472,863 B2 | 1/2009 | Pak | ................ | A63H 27/14 244/12.5 |
| 7,766,274 B1 * | 8/2010 | Jameson | ................ | B64C 39/024 244/137.1 |
| 8,146,855 B2 * | 4/2012 | Ismailov | ................ | B64C 39/024 244/3.27 |
| 8,297,552 B2 * | 10/2012 | Ying | ................ | B64F 1/005 244/114 R |
| 8,376,264 B1 | 2/2013 | Hong et al. | | |
| 8,439,301 B1 * | 5/2013 | Lussier | ................ | B64F 1/02 244/63 |
| 8,453,962 B2 * | 6/2013 | Shaw | ................ | B64C 27/20 244/12.4 |
| 8,511,606 B1 * | 8/2013 | Lutke | ................ | B64C 39/028 244/100 R |
| 8,590,828 B2 * | 11/2013 | Marcus | ................ | B64C 29/0058 244/1 R |
| 8,602,348 B2 * | 12/2013 | Bryant | ................ | B64C 29/0033 244/12.4 |
| 8,616,492 B2 * | 12/2013 | Oliver | ................ | B64C 29/0033 244/12.4 |
| 8,695,916 B2 * | 4/2014 | Martin | ................ | B64C 39/026 244/4 A |
| 8,733,690 B2 * | 5/2014 | Bevirt | ................ | B64C 29/0033 244/12.4 |
| 8,800,912 B2 * | 8/2014 | Oliver | ................ | B64C 29/0033 244/12.4 |
| 8,979,032 B1 * | 3/2015 | Hester, Jr. | ................ | B64C 39/024 244/137.4 |
| 9,056,676 B1 * | 6/2015 | Wang | ................ | B64F 1/00 |
| 9,102,401 B2 * | 8/2015 | Collins | ................ | B64C 29/0033 |
| 9,139,310 B1 | 9/2015 | Wang | | |
| 9,164,506 B1 | 10/2015 | Zang | | |
| 9,302,783 B2 | 4/2016 | Wang | | |
| 9,382,003 B2 * | 7/2016 | Burema | ................ | A01B 79/005 |
| 9,387,928 B1 * | 7/2016 | Gentry | ................ | B64C 39/024 |
| 9,429,945 B2 * | 8/2016 | Pulleti | ................ | G01S 13/56 |
| 9,527,588 B1 | 12/2016 | Rollefstad | | |
| 9,527,605 B1 * | 12/2016 | Gentry | ................ | B64F 1/12 |
| 9,561,871 B2 * | 2/2017 | Sugumaran | ................ | B64C 25/32 |
| 9,623,760 B2 * | 4/2017 | Wang | ................ | B60L 11/1822 |
| 9,880,563 B2 | 1/2018 | Fisher et al. | | |
| 9,977,435 B2 | 5/2018 | Fisher et al. | | |
| 10,124,912 B2 * | 11/2018 | Walsh | ................ | B64F 1/32 |
| 10,457,421 B2 | 10/2019 | O'Toole | | |
| 2005/0006525 A1 * | 1/2005 | Byers | ................ | B64C 1/061 244/118.1 |
| 2005/0066806 A1 * | 3/2005 | Helms | ................ | F41A 23/20 89/38 |
| 2005/0178879 A1 * | 8/2005 | Mao | ................ | B64C 29/02 244/7 B |
| 2005/0231157 A1 * | 10/2005 | Sanders, Jr. | ................ | B60L 8/00 320/109 |
| 2006/0192046 A1 | 8/2006 | Heath et al. | | |
| 2006/0249622 A1 * | 11/2006 | Steele | ................ | B64F 1/02 244/115 |
| 2006/0249623 A1 * | 11/2006 | Steele | ................ | B64F 1/02 244/116 |
| 2006/0261207 A1 * | 11/2006 | Woodruff | ................ | E04H 12/185 242/473.3 |
| 2007/0072639 A1 | 3/2007 | Frost et al. | | |
| 2009/0236470 A1 * | 9/2009 | Goossen | ................ | B64C 39/024 244/115 |
| 2009/0294573 A1 * | 12/2009 | Wilson | ................ | B64C 39/024 244/2 |
| 2010/0131121 A1 * | 5/2010 | Gerlock | ................ | G08G 5/0013 701/2 |
| 2010/0157055 A1 * | 6/2010 | Pechatnikov | ................ | G06T 7/20 348/144 |
| 2010/0168949 A1 | 7/2010 | Malecki et al. | | |
| 2010/0252690 A1 * | 10/2010 | Hothi | ................ | B64C 39/024 244/7 B |
| 2011/0042509 A1 | 2/2011 | Bevirt et al. | | |
| 2011/0168838 A1 * | 7/2011 | Hornback | ................ | B64C 39/028 244/63 |
| 2011/0174925 A1 * | 7/2011 | Ying | ................ | B64F 1/005 244/114 R |
| 2011/0180673 A1 * | 7/2011 | Lim | ................ | B64C 27/24 244/7 A |
| 2011/0264314 A1 * | 10/2011 | Parras | ................ | G05D 1/0676 701/16 |
| 2011/0303795 A1 * | 12/2011 | Oliver | ................ | B64C 29/0033 244/7 R |
| 2012/0001020 A1 * | 1/2012 | Miralles | ................ | B64C 39/024 244/63 |
| 2012/0043413 A1 | 2/2012 | Smith | | |
| 2012/0050090 A1 * | 3/2012 | Rudnisky | ................ | G01S 7/295 342/73 |
| 2012/0080556 A1 * | 4/2012 | Root, Jr. | ................ | B64F 1/02 244/63 |
| 2012/0091257 A1 * | 4/2012 | Wolff | ................ | B64C 29/0033 244/12.4 |
| 2012/0210853 A1 * | 8/2012 | Abershitz | ................ | B64F 1/04 89/1.11 |
| 2012/0215382 A1 | 8/2012 | Lee et al. | | |
| 2012/0248259 A1 | 10/2012 | Page et al. | | |
| 2012/0271491 A1 | 10/2012 | Spata | | |

(56) References Cited

U.S. PATENT DOCUMENTS

| | | | |
|---|---|---|---|
| 2012/0318915 A1* | 12/2012 | Gatzke | B64D 41/00 244/58 |
| 2013/0161447 A1* | 6/2013 | McGeer | B64C 39/024 244/110 F |
| 2013/0176423 A1 | 7/2013 | Rischmuller et al. | |
| 2013/0318214 A1* | 11/2013 | Tebay | H04L 67/06 709/219 |
| 2014/0032034 A1* | 1/2014 | Raptopoulos | G08G 5/0069 701/25 |
| 2014/0124621 A1* | 5/2014 | Godzdanker | B64F 1/125 244/110 E |
| 2014/0126838 A1* | 5/2014 | Schultz | G06T 3/4038 382/284 |
| 2014/0236390 A1 | 8/2014 | Mohamadi | |
| 2014/0277834 A1* | 9/2014 | Levien | B64C 39/024 701/2 |
| 2014/0316616 A1* | 10/2014 | Kugelmass | G05D 1/101 701/8 |
| 2015/0136897 A1 | 5/2015 | Seibel et al. | |
| 2015/0158598 A1* | 6/2015 | You | B64F 1/18 701/16 |
| 2015/0254738 A1 | 9/2015 | Wright et al. | |
| 2015/0321758 A1* | 11/2015 | Sarna, II | B64C 39/024 244/63 |
| 2015/0336669 A1* | 11/2015 | Kantor | G01C 21/3415 701/3 |
| 2016/0009413 A1 | 1/2016 | Lee et al. | |
| 2016/0011592 A1* | 1/2016 | Zhang | B64C 39/024 701/2 |
| 2016/0019794 A1 | 1/2016 | Dominic et al. | |
| 2016/0033966 A1 | 2/2016 | Farris et al. | |
| 2016/0039542 A1* | 2/2016 | Wang | B60L 11/1809 701/2 |
| 2016/0068265 A1* | 3/2016 | Hoareau | G05D 1/102 701/3 |
| 2016/0101876 A1 | 4/2016 | Wolfe | |
| 2016/0117931 A1 | 4/2016 | Chan et al. | |
| 2016/0137311 A1* | 5/2016 | Peverill | B64C 39/024 244/110 C |
| 2016/0144734 A1* | 5/2016 | Wang | B60L 11/1822 701/17 |
| 2016/0157414 A1 | 6/2016 | Ackerman et al. | |
| 2016/0185466 A1 | 6/2016 | Dreano | |
| 2016/0196756 A1* | 7/2016 | Prakash | B64C 39/024 701/3 |
| 2016/0229299 A1* | 8/2016 | Streett | B64C 39/024 |
| 2016/0247404 A1 | 8/2016 | Srivastava et al. | |
| 2016/0253808 A1* | 9/2016 | Metzler | B64C 39/024 382/103 |
| 2016/0257401 A1* | 9/2016 | Buchmueller | B64C 39/024 |
| 2016/0358432 A1 | 12/2016 | Branscomb et al. | |
| 2016/0376031 A1* | 12/2016 | Michalski | B64F 1/36 701/15 |
| 2017/0027155 A1 | 2/2017 | Ehrlich et al. | |
| 2017/0083979 A1 | 3/2017 | Winn et al. | |
| 2017/0101017 A1* | 4/2017 | Streett | B64C 39/024 |
| 2017/0158353 A1* | 6/2017 | Schmick | B64F 1/007 |
| 2017/0160740 A1* | 6/2017 | Srivastava | G05D 1/0027 |
| 2017/0161968 A1 | 6/2017 | Xie et al. | |
| 2017/0177006 A1* | 6/2017 | Fisher | G05D 1/102 |
| 2017/0186329 A1 | 6/2017 | Gao et al. | |
| 2017/0190260 A1 | 7/2017 | Wang et al. | |
| 2017/0203857 A1 | 7/2017 | O'Toole | |
| 2017/0225802 A1 | 8/2017 | Lussier et al. | |
| 2017/0227965 A1 | 8/2017 | DeCenzo et al. | |
| 2017/0259917 A1 | 9/2017 | Winn et al. | |

FOREIGN PATENT DOCUMENTS

| | | |
|---|---|---|
| WO | 2009066073 A1 | 5/2009 |
| WO | 2011159281 A1 | 12/2011 |
| WO | 2015012935 A2 | 1/2015 |

OTHER PUBLICATIONS

First Office Action for CN Application No. 201480033924X dated Nov. 15, 2016.

Intellectual Property Office of Singapore Written Opinion for Application No. 11201508858P dated Sep. 5, 2016.

International Search Report and Written Opinion for PCT/US14/36863, dated Mar. 20, 2015.

International Search Report and Written Opinion for PCT/US16/17407 dated Jul. 27, 2016.

International Search Report and Written Opinion for serial No. PCT/US16/17400, dated May 12, 2016.

International Search Report for PCT/US16/17417 dated Jul. 27, 2016.

International Search Report for PCT/US16/17540 dated May 23, 2016.

International Search Report for PCT/US16/17614 dated May 19, 2016.

International Search Report for PCT/US14/36863 dated Mar. 20, 2015.

Oosedo, Konno, Matumoto, Go, Masuko, Abiko, and Uchiyama, "Design and Simulation of a Quad Rotor Tail-Sitter Unmanned Aerial Vehicle," Tohoku University, IEEE, 2010, 978-1-4244-9315-9/10.

Non-Final Office action for U.S. Appl. No. 14/270,320 dated Feb. 25, 2016.

\* cited by examiner

POD COVER SYSTEM FOR A VERTICAL TAKE-OFF AND LANDING (VTOL) UNMANNED AERIAL VEHICLE (UAV)

CROSS-REFERENCE TO RELATED APPLICATIONS

This application claims priority to and the benefit of U.S. Provisional Patent Application No. 62/115,074, filed Feb. 11, 2015, the contents of which are hereby incorporated by reference herein for all purposes.

BACKGROUND

Technical Field

The field of the invention relates to unmanned aerial vehicle (UAV) systems, and more particularly to systems for operating a UAV autonomously.

Description of the Related Art

Aerial geographic survey work for the agricultural and oil industries incur the logistics and costs of personnel to operate and maintain the air vehicle as well as collect and process the associated data. These costs are typically compounded by need for a substantial amount of this work to be performed at, or relatively near to, the location of the survey, which typically is well removed from any population centers. As a result, it is advantageous to increase automation, reliability (reduce complexity), range, and capability of an air vehicle and support system for performing such data retrieval and processing tasks.

SUMMARY

An unmanned aerial vehicle (UAV) storage and launch system includes a UAV pod having an open position and a closed position, the closed position establishing an interior that is weather resistant to an environment external to the UAV pod and a vertical takeoff and landing (VTOL) UAV enclosed in the UAV pod so that the UAV pod in the closed position provides a weather resistant interior for the VTOL UAV. The system may also include a two-part hinged cover that rotates away from the VTOL UAV when transitioning from the closed position to the open position, and may include solar panels on at least one exterior surface. The solar panels may charge at least one of a UAV pod battery and a VTOL UAV battery. In embodiments, the two-part hinged cover may be positioned to maximize the collection of solar energy by the solar panels and the two-part hinged cover may be positioned closed after the VTOL UAV is launched and returned to the open position before the VTOL UAV lands. In one embodiment, the UAV pod may include four lateral faces that rotate away from the VTOL UAV when moving from the closed position to the open position. The four lateral faces may be angled for low wind resistance in the closed position, and at least one of the four lateral faces may include a solar panel. The UAV pod may also include a pair of UAV support pads, each of the UAV support pads extending from a respective and opposing lateral face, wherein the pair of UAV support pads hold the VTOL UAV in position inside the UAV pod while in the closed position. The UAV pod may be waterproof in the closed position. In embodiments, the UAV pod also includes a top cover, and the top cover may laterally translate across a top opening of the UAV pod when transitioning from the closed position to the open position. The UAV pod may also include a proximity sensor, wherein the proximity sensor detects the presence of any object positioned over the UAV pod. The UAV pod may also include one or more UAV support pads, wherein the one or more UAV support pads hold the VTOL UAV in position inside the UAV pod while in the closed position. In such embodiments, the one or more UAV support pads may have a UAV-facing surface that have a complementary shape to an exterior of the VTOL UAV, so that the UAV-facing surface of the one or more UAV support pads resists lateral movements of the VTOL UAV inside the UAV pod. In one embodiment, the one or more UAV support pads extend from one or more opposing lateral faces of the UAV pod. The system may also include a UAV pod processor and a UAV pod transceiver in communication with the UAV pod processor. In such embodiments, the UAV pod processor may be configured to launch the UAV autonomously and without concurrent human intervention. The UAV pod processor may also be configured to receive geographic survey data and save the geographic survey data in a UAV pod memory in communication with the UAV pod processor.

An unmanned aerial vehicle (UAV) storage and launch system also includes a UAV pod having a rotatable protective cover, a vertical takeoff and landing (VTOL) UAV enclosed in the UAV pod, and a UAV guide extending from the rotatable cover and engaging the UAV so that the VTOL UAV is protected from rain and particulate matter inside the UAV pod when the rotatable cover is in the closed position. The system may also include a rotatable landing surface, the rotatable landing surface co-rotatable complementary with the rotatable cover to position the UAV for takeoff when the rotatable cover is open. In one embodiment, the rotatable landing surface and rotatable protective cover are separately rotatable. In another embodiment, the rotatable landing surface and rotatable protective cover are rotatably engaged to co-rotate together. The UAV may be in a horizontal position when the rotatable protective cover is in the closed position, and in a vertical position when the rotatable protective cover is in the open position. The UAV guide may be a post. In embodiments, the rotatable cover may be coupled to the rotatable landing surface through an armature, the rotatable cover and rotatable landing surface rotatably engage to co-rotate together. The system may also include a UAV pod processor and a UAV pod transceiver in communication with the UAV pod processor. In such embodiments, the UAV pod processor may be configured to launch the UAV autonomously and without concurrent human intervention. The UAV pod processor may also be configured to receive geographic survey data and to save the geographic survey data in a UAV pod memory that is in communication with the UAV pod processor.

A method of unmanned aerial vehicle (UAV) pod control includes rotating a UAV pod protective cover from a closed position to an open position, rotating a landing surface from storage position to a launch position and transmitting a launch command from a UAV pod transmitter to a UAV transceiver to launch the UAV autonomously and without concurrent active human intervention in response to a pre-programmed condition. The rotating of the UAV pod protective cover and the rotating of the landing surface may occur concurrently. In an alternative embodiment, the rotating of the UAV pod protective cover happens before the rotating of the landing surface.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

A vertical takeoff and landing (VTOL) unmanned aerial vehicle (UAV) storage and launch system is disclosed that provides for improved remote geographic survey capabilities. Multiple autonomous mission launches and landings may be accomplished using a two-rotor VTOL UAV that is capable of efficient horizontal flight, and a UAV pod having a UAV pod processor, with the UAV selectively enclosed in the UAV pod for protection against the external environment when not in use, recharging and/or transferring data.

A UAV pod is described that may transition between an open position and a closed position. In the closed position, the UAV pod may be waterproof and protect a UAV enclosed inside the UAV pod from other particulate matter that may exist in the external environment. In the open position, the UAV pod may orient the UAV into a position for launch and/or landing. The UAV pod may have a two-part hinged cover that translates away from the UAV when moving from a closed position to an open position. In other embodiments, the UAV pod may have four lateral faces that form a cover or have a retractable cover. The cover may have solar panels on an external surface of the cover and these external surfaces may be moved to maximize solar energy collection during the time between the UAV launch and the UAV landing. The UAV pod may have a proximity sensor that detects any objects above the UAV pod before launching the UAV and/or transitioning to an open position.

Exemplary UAV Pod and UAV Structure

Figure 1:
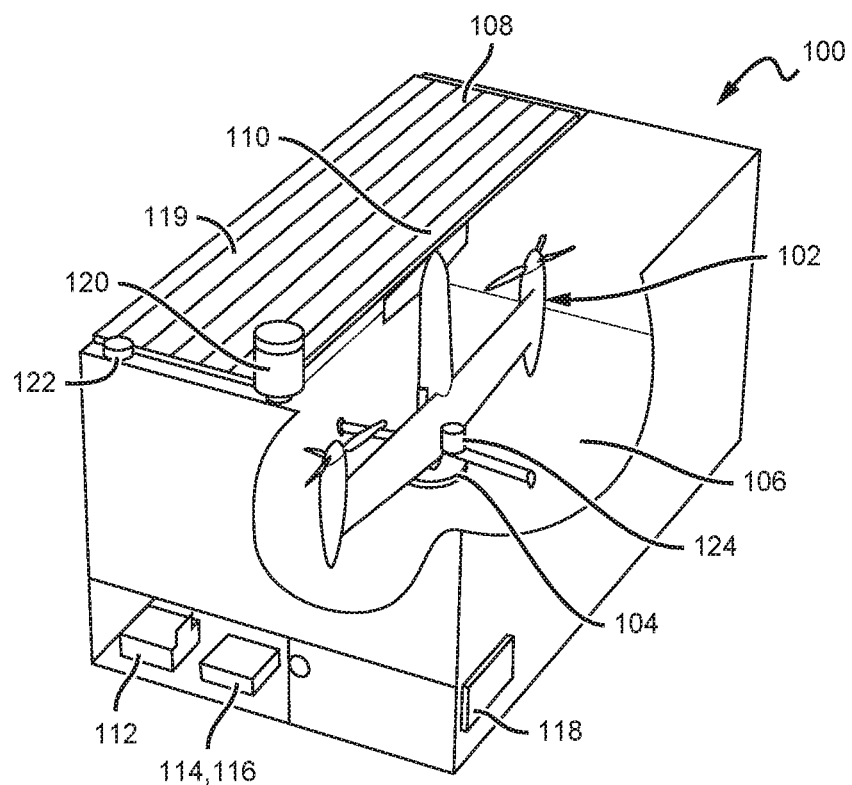
FIG. 1 is a perspective view of one embodiment of a UAV pod that may house and protect an extended range VTOL UAV to accomplish multiple autonomous launches, landings and data retrieval missions.

FIG. 1 is a perspective cut-away view of one embodiment of a UAV pod in a closed position that may house and protect an extended range VTOL UAV to accomplish multiple autonomous launches, landings and data retrieval missions.

The illustrated system 100 has a winged two rotor UAV 102 seated on a landing surface 104 of an interior 106 of the UAV pod 108. The UAV 102 is seated in a vertical launch position to facilitate later launch out of the UAV pod 108. The UAV pod 108 may selectively enclose the UAV 102, such as through the use of a UAV pod protective cover 110. The cover 110 may be a two-part hinged cover that is operable to open to enable launch and landing of the UAV 102 and to position closed to establish an interior that weather resistant to an external environment that may include rain, snow, sleet, dust, and other particulate matter to protect the enclosed UAV 102. Such hardening may be accomplished using pliable seals disposed about a perimeter of the cover or by the use of overlapping cover material or by other means. In other embodiments, the UAV pod 108 is waterproof when the cover 110 is closed. The UAV pod 108 may have a short-range UAV pod transceiver 112 that may be seated in a compartment below the landing surface 104, within their own separate compartments, or may be seated elsewhere within the UAV pod 108 for protection from the external environment. The UAV pod transceiver 112 may receive UAV flight telemetry such as UAV flight and trajectory information, UAV battery status information and sensor data (such as video), and other data transmitted by the UAV 102. The UAV pod transceiver 112 may also transmit flight control data such as navigation (e.g., re-routing instructions) to the UAV 102. A UAV pod processor 114 may also be housed within the UAV pod 108 to accomplish, among other functions, providing the UAV 102 with a plurality of missions, receiving flight survey data from the UAV 102, monitoring the UAV pod 108 for overhead obstacles, monitoring the external environment such as the weather through the weather sensor, monitoring the trajectory of the UAV 102, and providing navigation instructions to the UAV 102 in response to receiving UAV battery status or other flight warning condition data inputs.

A UAV pod memory 116 may also be housed within the UAV pod 108 for storing UAV flight mission information and geographic survey data. A UAV pod battery 118 may be enclosed in the UAV pod for recharging the UAV 102 and for providing power to the UAV pod 108 such as for use by the processor 114 and cover motor (not shown). The battery 118 may be rechargeable such as through solar panels 119, or may be a permanent battery such as a 12-Volt deep cycle marine battery. In an alternative embodiment, the battery 118 may be a fuel cell. In some embodiments, the UAV pod 108 will use the solar panels 119 to charge the battery 118 to later charge the battery of the UAV 102. Typically, the UAV pod 108 will be charging the battery 118 while the UAV 102 is out of the pod 108 executing a mission and will recharge the UAV 102 upon its return to the UAV pod 108.

A weather sensor 120 in communication with the UAV pod processor 114 may extend from an exterior of the UAV pod 108 to enable accurate measurement of the external environment, such as wind speed, temperature and barometric pressure. A proximity sensor or sensors may also be provided (122, 124) and in communication with the UAV pod processor 114 to enable go and no-go flight decisions based on the proximity of any objects or other obstructions positioned over the UAV pod cover 110. The remainder of the UAV pod 108 is also preferably weather hardened to enable extended outdoor use regardless of weather conditions such as rain, snow, sleet, dust, and other particulate matter.

Figure 2:
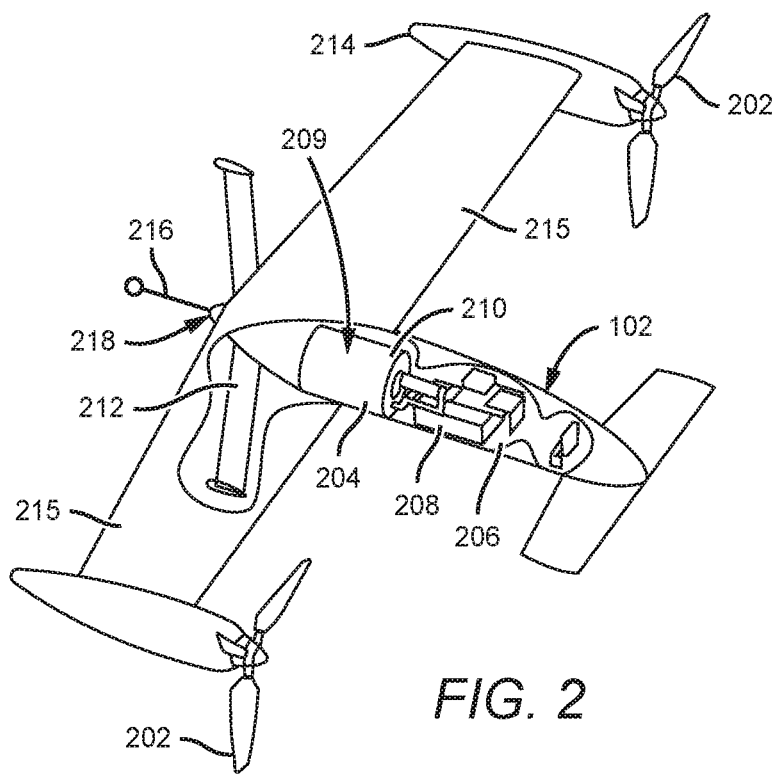
FIG. 2 is a perspective view of the two-rotor UAV first illustrated in FIG. 1.

FIG. 2 is a perspective view of the two-rotor UAV 102 first illustrated in FIG. 1. The UAV 102 has only two rotors 202, enabling vertical takeoff and landing (VTOL) missions out of the UAV pod 108 (see FIG. 1). The UAV 102 has a UAV transceiver 204 within a UAV fuselage 206. A UAV processor 208 is also seated in the UAV 102 and in communication with the UAV transceiver 204. The UAV 102 also includes a battery 209 for providing power to the rotor motors and the electronics, including the processor 208. The UAV processor 208 is configured to receive a plurality of flight mission information that may include waypoints, altitude, flight speed, sensor suite configuration data, launch day/time and mission weather sensor go and no-go parameters. The UAV 102 may have a variety of electrical optical (EO) sensors 210, such as LiDAR, RADAR, infrared, visible-spectrum cameras, or other active or passive sensors that may be used to detect soil moisture, crop density, crop health, terrain, or other objects or qualities of interest. The UAV 102 may have a rear landing gear 212 extending off of a rear of the fuselage 206 that may be used in combination with UAV engine nacelles 214 to enable a four-point landing for more stable landings on the UAV pod 108 (see FIG. 1). The landing gear 212 may also function as a flight surface or aerodynamic surface, such as a vertical stabilizer, providing corrective (passive) forces to stabilize the UAV 102 in flight, such as to stabilize in a yaw direction. The UAV 102 may have wings 215 to provide the primary source of lift during the UAV cruise (e.g., horizontal flight), while the two rotors 202 provide the primary source of lift during the VTOL phases of UAV flight. This combination of wing and rotor use allows for efficient flight while collecting flight survey data, which increases the range and/or duration of a particular flight while also allowing the UAV 102 to land and take off from the relatively small UAV pod 108 (see FIG. 1) landing area. In one embodiment, the UAV 102 may take off and land vertically using the two rotors 202 that themselves are operable to lift the UAV 102 vertically upwards, transition the UAV 102 to horizontal flight to conduct its survey or other flight mission, and then transition it back to vertical flight to land the UAV 102 vertically downwards, with attitudinal control for the UAV 102 in all modes of flight (vertical and horizontal) coming entirely from the rotors 202 (as driven by a means of propulsion) without the benefit or need of aerodynamic control surfaces, such as ailerons, an elevator, or a rudder. One such UAV 102 is described in international patent application number PCT/US14/36863 filed May 5, 2014, entitled "Vertical Takeoff and Landing (VTOL) Air Vehicle" and is incorporated by reference in its entirety herein for all purposes. Such a UAV 102 benefits from a more robust structure by reducing the opportunity for damage to control surfaces (i.e., there aren't any), and may be made lighter and with less complexity.

The UAV 102 may also be provided with a rearward facing tang 216 extending off of a rear portion 218 of the fuselage 206 in lieu of or in addition to rear landing gear 212. Such rearward-facing tang 216 may be metallic or have metallic contacts for receipt of electrical signals (i.e., data) and/or power for charging the UAV's battery 209.

Figure 3A:
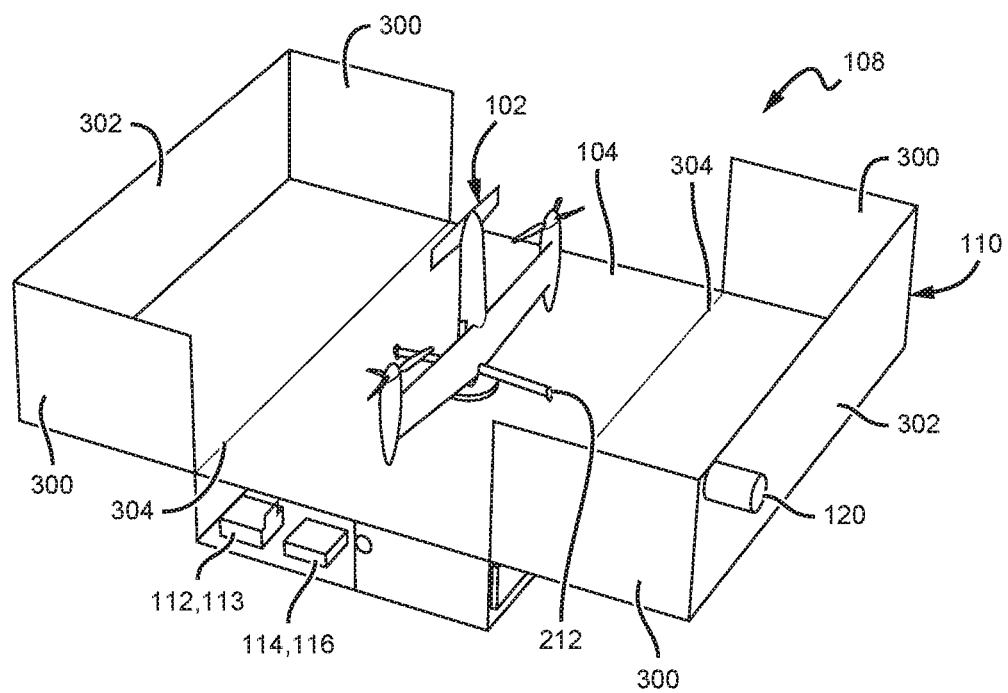
FIGS. 3A and 3B illustrate the UAV pod in its open and closed configurations, respectively.
Figure 3B:
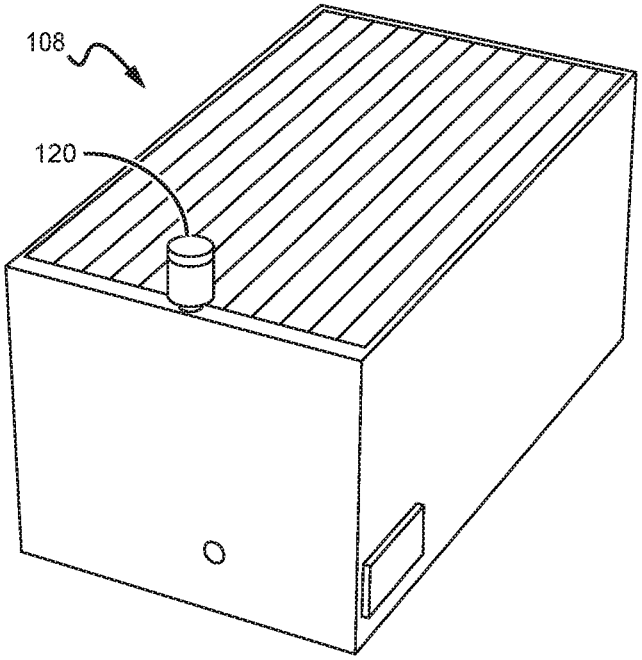

FIGS. 3A and 3B illustrate the UAV pod 108 in its open and closed configurations, respectively. In FIG. 3A, the UAV 102 is illustrated in its vertical configuration and seated on a landing surface 104 of the UAV pod 108. The UAV 102 is shown positioned at least generally aligned with the rectangular dimensions of the UAV pod 108. In embodiments, the landing surface 104 is rotatable to position the UAV. In FIG. 3A, the cover 110 is open to enable unobstructed launch, and later landing, of the UAV 102. The cover 110 is illustrated with side portions 300 and top portions 302, with hinges 304 that are operable to rotate the cover 110 away from the UAV for launch. In an alternative embodiment, only the top portions 302 are hinged to enable unobstructed launch of the UAV 102. Alternatively, the top portions 302 may translate out of the flight path linearly or using a mechanism and motion so that the UAV is free to launch. In one embodiment, the landing gear 212 may be omitted and the UAV 102 may be guided into and out of one or more slots, guide rails, channels, or other guiding structure to both secure the UAV 102 during its landed state and enable landing. The weather sensor 120 may be coupled to the cover 110 or may extend off the side of the UAV pod 108 (not shown). Also, although the UAV pod 108 is illustrated having a rectangular cross-section and a box-like structure, the UAV pod 108 may take the form of a dome-shaped structure or other configuration that enables stable placement and protection for the selectively enclosed UAV. The cover 110 can include solar panels on its exterior (not shown), and in some embodiments one or both of the covers 110 can be positioned, and moved, about the hinges 304 to be perpendicular to the sun's rays to maximize the collection of solar energy. In other embodiments, the short-range UAV pod transceiver 112 may also have features of or include a long-range UAV pod transceiver 113 for communication with a cellular tower.

Local UAV Operation

Figure 4:
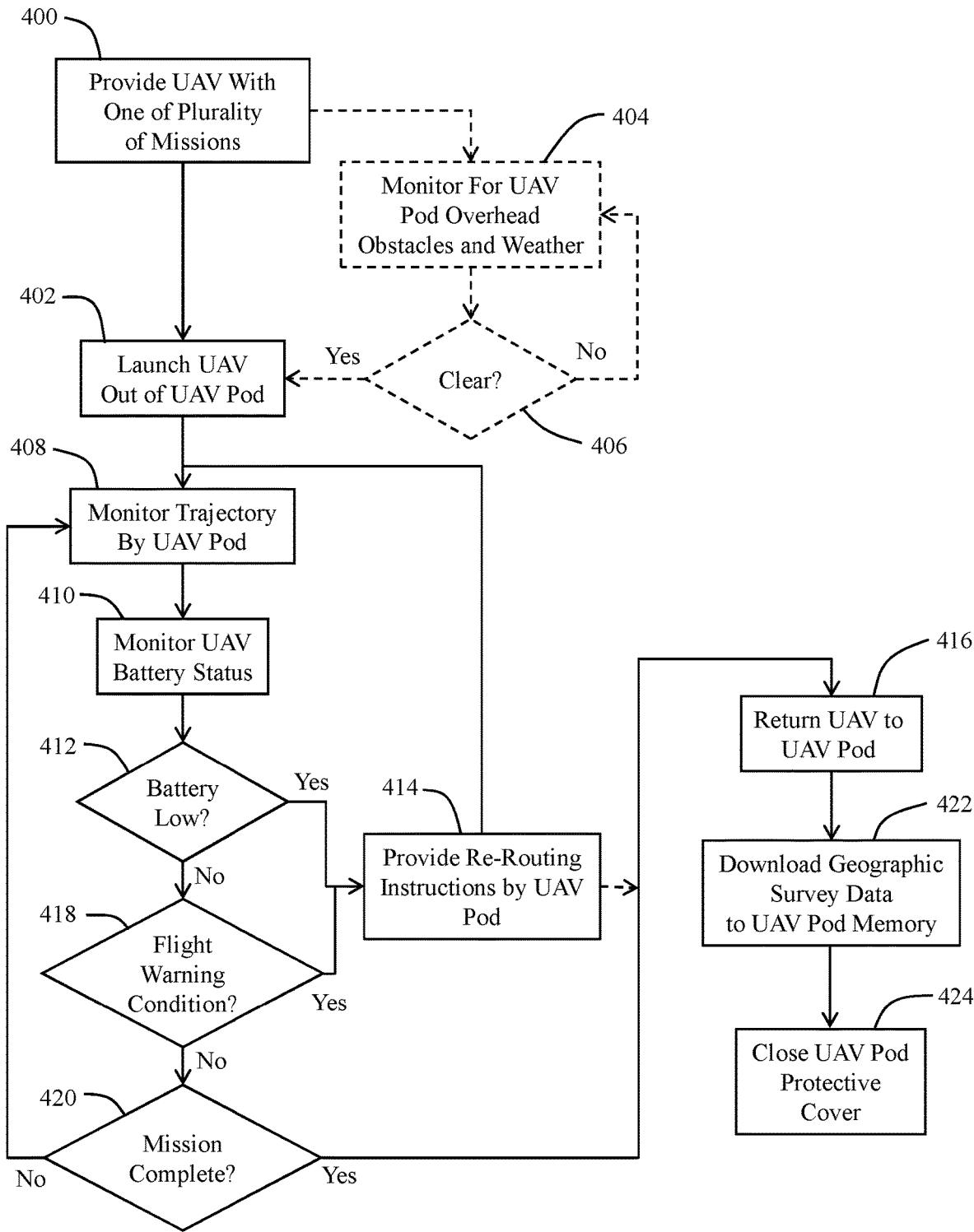
FIG. 4 is a flow diagram illustrating one embodiment of a method of conducting flight missions for the UAV.

FIG. 4 is a flow diagram illustrating one embodiment of a method of conducting flight missions for the UAV. The UAV may be provided with one of the plurality of missions (block 400) that reside in the UAV pod. The UAV may be caused to launch vertically out of the UAV pod (block 402) in response to a comment from a UAV pod processor, preferably under the UAV's own power using the two rotors on the UAV. In one embodiment, the launch is commanded autonomously and without concurrent active human intervention in response to a pre-programmed condition such as day and time. The immediate environment over the UAV pod may be monitored for obstacles and weather (block 404) that may otherwise interfere with launch of the UAV. In such an embodiment, if no obstructions are detected (block 406), then the UAV may be launched out of the UAV pod (block 402). Otherwise, launch of the UAV is delayed or cancelled and the UAV pod continues to monitor for overhead obstacles and weather (block 404, 406), as well as the UAV battery status (block 410). After launch, the UAV pod may monitor the UAV's trajectory (block 408). If UAV battery power is low or otherwise drops below a predetermined voltage threshold (block 412), then the UAV pod may provide rerouting instructions to the UAV (block 414) to shorten the current mission to enable a safe return of the UAV to the UAV pod. In an alternative embodiment, the UAV is directed to return immediately to the UAV pod (block 416) or to an intermediate pre-determined position. If, however, the battery is not low (block 412), and no other flight warning condition is triggered (block 418) the mission continues (block 420). If the current UAV mission has been completed (block 420), the UAV returns to the UAV pod (block 416) for landing and the geographic survey data is downloaded to the UAV pod memory (block 422) such as by a wireless or wired transfer of the mission data to the UAV pod memory. The UAV pod protective cover may be closed (block 424) to protect the UAV from the external environment (i.e., rain, direct sun, vandals, or damaging particulate matter).

Alternative UAV Pod Covers and Landing Mechanisms

Figure 5:
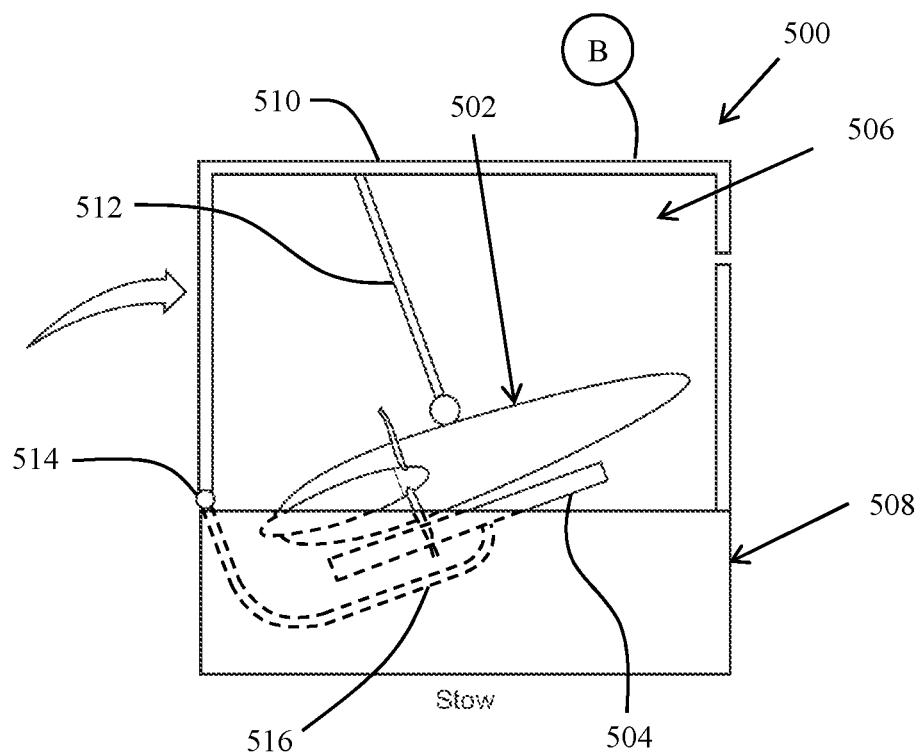
FIGS. 5 and 6 are perspective views depicting closed and open embodiments, respectively, of a UAV pod that has a protective cover configured to rotate cooperatively with a rotatable landing surface to create a UAV pod having a low profile.
Figure 6:
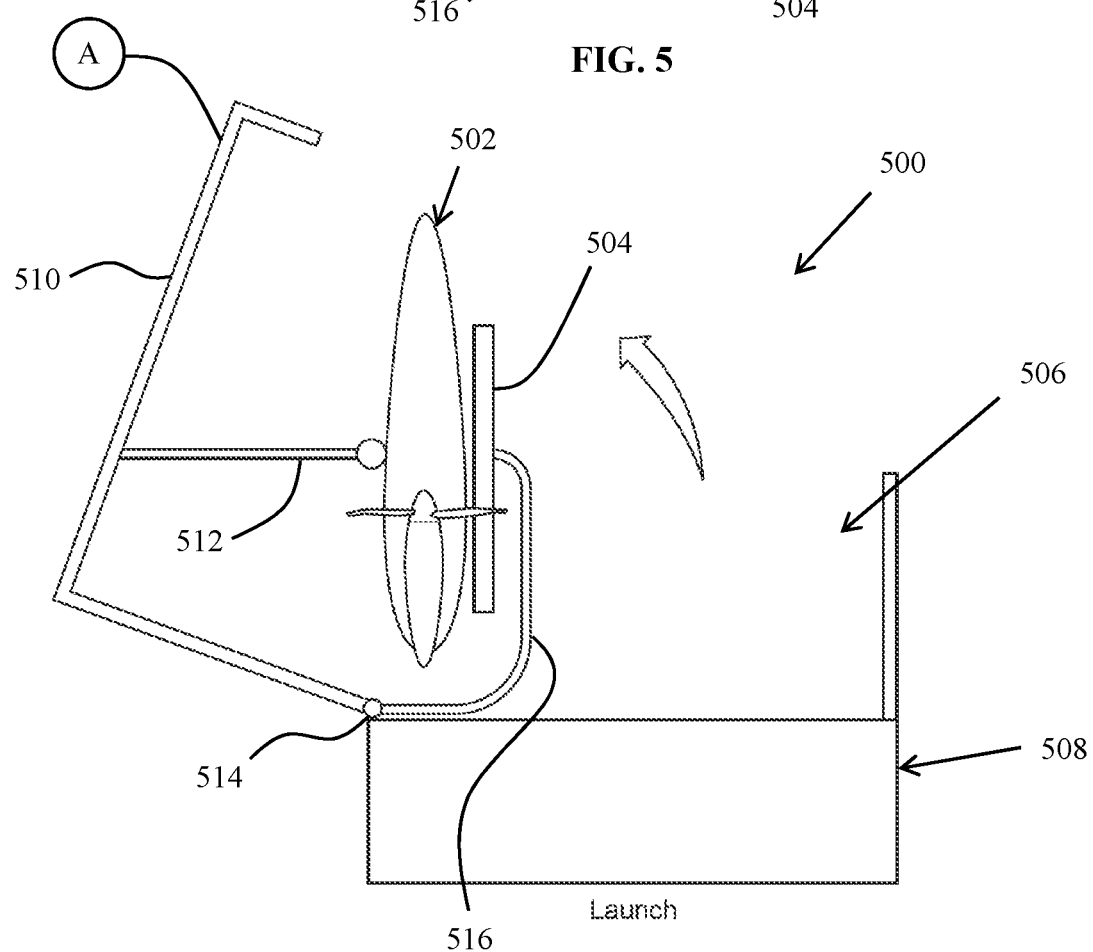

FIGS. 5 and 6 are perspective views depicting closed and open embodiments, respectively, of a UAV pod that has a protective cover configured to rotate cooperatively with a rotatable landing surface to create a UAV pod having a low profile. The illustrated system 500 has a two rotor UAV 502 seated on a landing surface 504 of an interior 506 of the UAV pod 508. The UAV pod 508 may selectively enclose the UAV 502, such as through the use of a UAV pod rotatable protective cover 510. A UAV guide 512 may extend from the rotatable protective cover 510 to engage the UAV 502 so that the UAV 502 is positioned and secured between the UAV guide 512 and the landing surface 504. In one embodiment, the UAV guide 512 is a post that abuts or otherwise presses against an exterior surface of the UAV 502 to hold it to the landing surface 504 using friction. In another embodiment, the UAV guide 512 is a mechanism that engages with the UAV 502, such as a clasp or ring that captures a complementary post or structure on the UAV 502 itself. The rotatable protective cover 510 may rotate about a hinge 514 to an open position (position "A"), with the landing surface 504 also operable to rotate about the hinge 514 from a storage position until the UAV 502 is rotatably positioned into a vertical launch position. The rotatable cover 510 is preferably rotatably engaged and coupled to the landing surface 504 through an armature 516 for co-rotation of each by a cover driver (not shown), although in an alternative embodiment the cover 510 and landing surface 504 are separately rotatable. In FIG. 6, the UAV 502 is illustrated in its vertical configuration and supported by a support member (not shown). As the cover 510 rotates back to a closed position (position "B"), the landing surface also rotates to cooperatively rotate the UAV 502 back into the interior 506 of the UAV pod 508 to a storage position.

Figure 7:
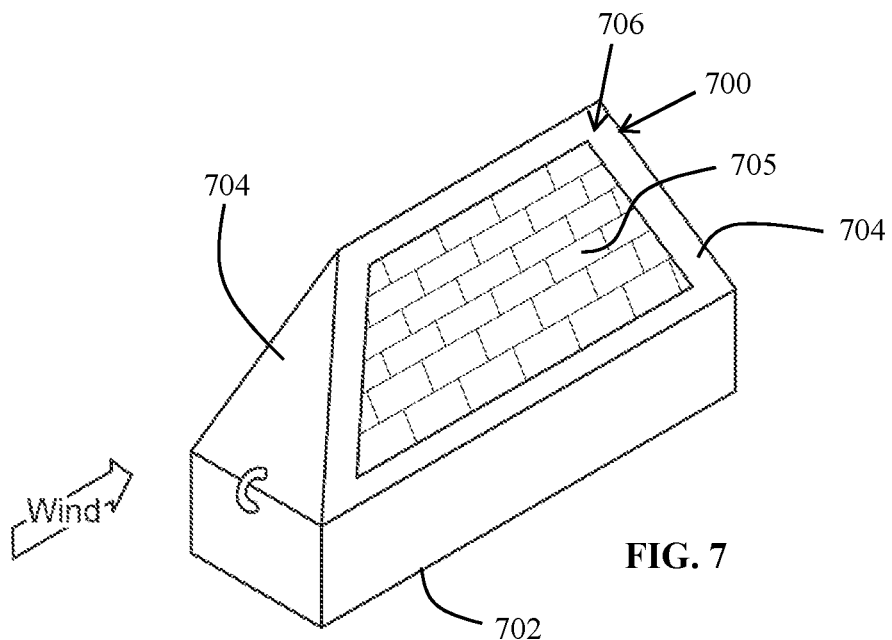
FIGS. 7 and 8 are side perspective and cross sectional views, respectively, of another embodiment of a UAV pod having a low profile when closed, with lateral faces angled for low wind resistance and favorable positioning of solar cells.
Figure 8:
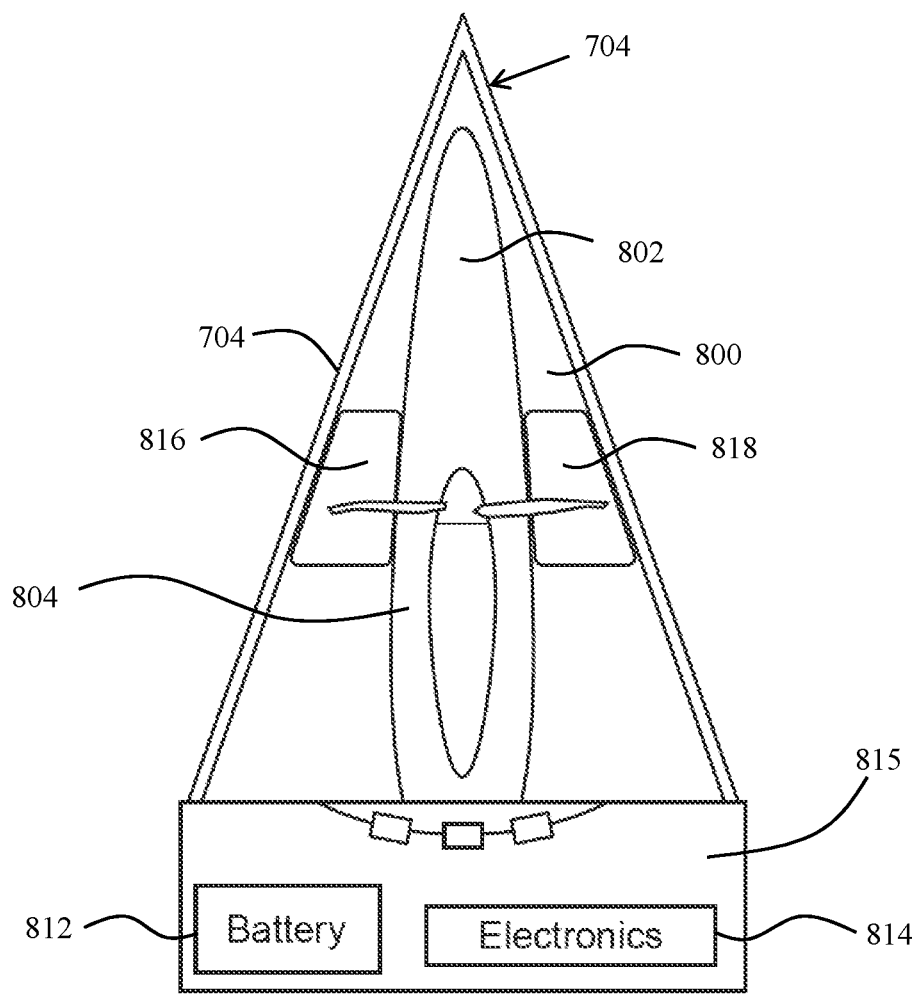

FIGS. 7 and 8 are side perspective and cross sectional views, respectively, of another embodiment of a UAV pod having a low profile when closed, with lateral faces angled for low wind resistance and favorable positioning of solar cells. The UAV pod 700 may have a quadrilateral base 702, preferably rectangular, and polygonal lateral faces 704 that taper to a top of the UAV pod 700. The solar cells 705 may be positioned on one or more of the polygonal lateral faces 704. The polygonal lateral faces 704 may form a UAV pod cover 706 that may selectively enclose a two-rotor UAV in an interior 800 of the UAV pod 700. The UAV pod cover 706 may be waterproof, but not sealed, for environmental protection for the UAV against the external environment. A battery 812 and UAV pod electronics 814 may be enclosed within an interior compartment 815 for further protection from the external environment. Cover UAV-support pads (816, 818) extend from opposing lateral faces 704 of the UAV pod cover 706 into the interior 800 of the UAV pod 700 to abut and hold into position the UAV 802 when in the closed position (see FIG. 8). This holding of the UAV 802 in place by the cover UAV-support pads 816 and 818 facilitate transportation of the UAV and pod system to and from locations by preventing or reducing possible damage to the UAV during transit.

Figure 9:
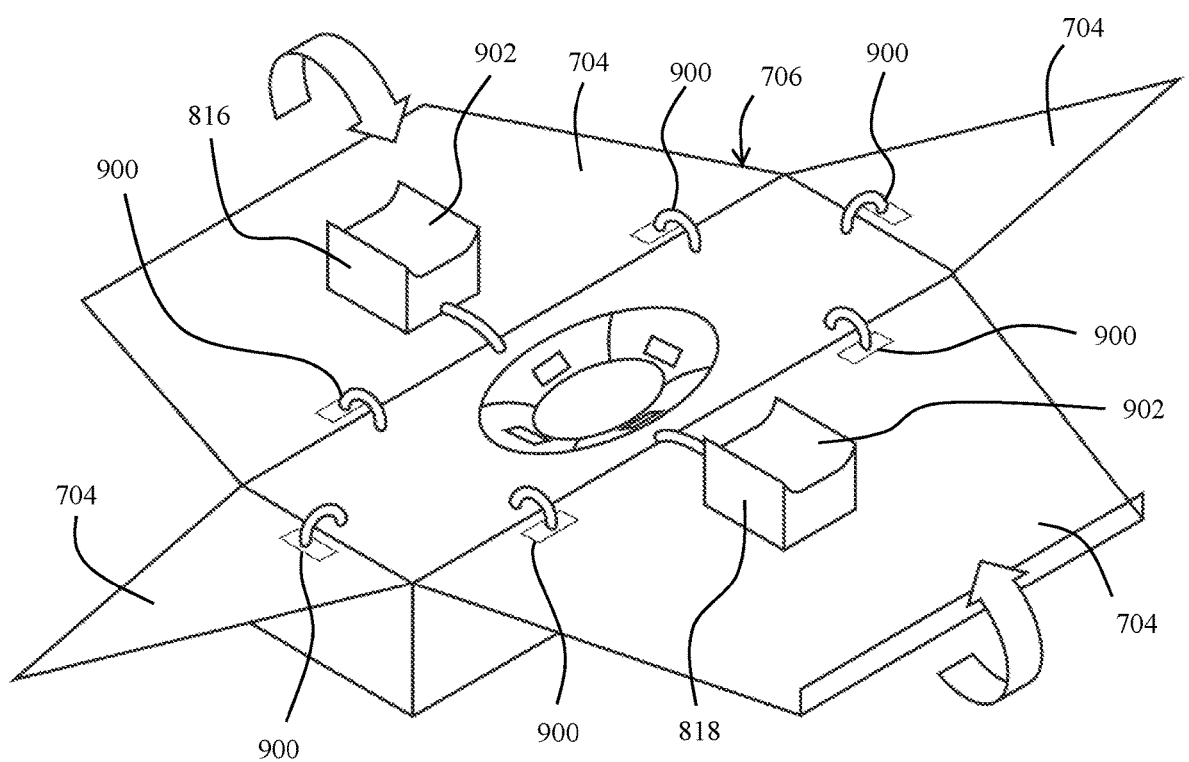
FIG. 9 depicts an open position of the UAV pod cover first illustrated in FIGS. 7 and 8.
Figure 10:
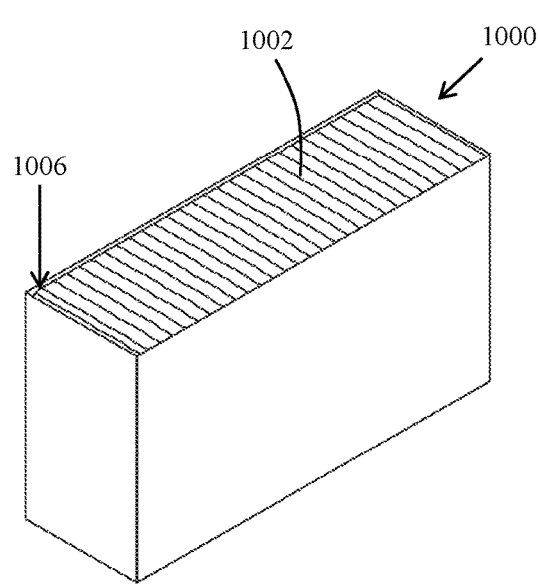
FIGS. 10, 11, 12 and 13 illustrate perspective views of closed, ready-for-landing, landed, and ready-for-closing configurations, respectively, of another embodiment of a UAV pod that allows for advantageous orientation for take-off and landing of a UAV in wind.
Figure 11:
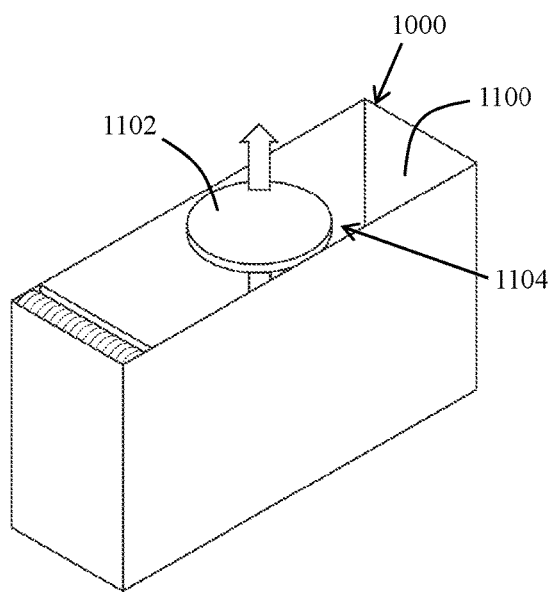
Figure 12:
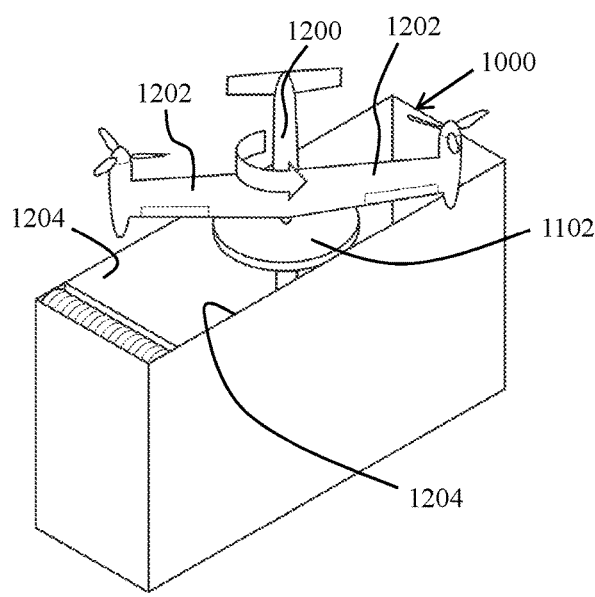
Figure 13:
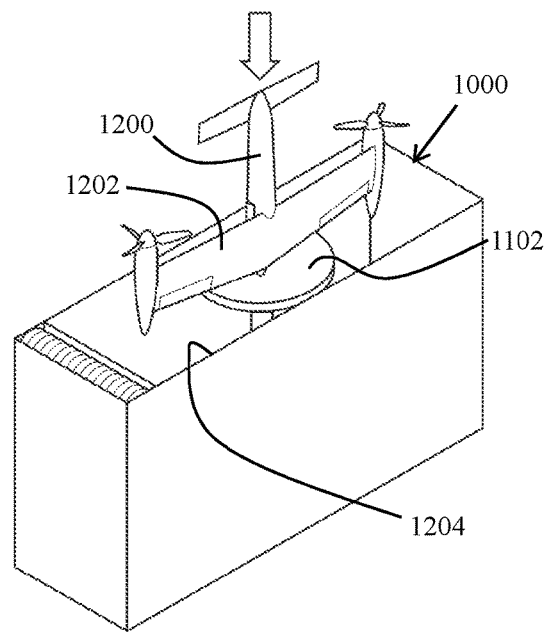

FIG. 9 depicts an open position of the UAV pod cover 706 first illustrated in FIGS. 7 and 8. In the illustrated embodiment, each of the four lateral faces 704 have respective hinges 900 that enable the faces 704 to rotate outwardly away from the interior 800 of the UAV pod 700 to expose the UAV 802 for unobstructed launch. The cover pads (816, 818) may have UAV-facing surfaces 902 that have a complementary shape to that of an exterior surface 804 (see FIG. 8) of the UAV to better secure the UAV from lateral movement within the interior. The cover pads (816, 818) may also incorporate UAV charging and cooling functions so that as the cover 706 is closed to about the UAV 802, the UAV pads (816, 818) contact complementary contacts on the UAV (not shown) to close an electrical circuit for charging of the UAV's internal batteries, or to enable inductive charging (i.e., wireless charging) of the UAV's batteries. Such contacts may also enable closed-circuit communication between the UAV 802 and the UAV pod 700 (including the electronics 814).

FIGS. 10, 11, 12 and 13 illustrate perspective views of closed, ready-for-landing, landed, and ready-for-closing configurations, respectively, of another embodiment of a UAV pod 1000 that allows for advantageous orientation for take-off and landing of a UAV in wind. An articulated roller top cover 1002 is operable to translate laterally across a top opening 1104 of the UAV pod 1000 to be taken up at a proximal end 1006 of the UAV pod 1000 (such as by rolling) to expose an interior volume 1100 of the UAV pod 1000. A telescoping landing surface 1102 may translate up toward the top opening 1104 of the interior volume 1100 for receipt (or launch) of a UAV 1200. Subsequent to the UAV 1200 landing on the landing surface 1102, the landing surface 1102 may be rotated (indicated by arrows) to better position the UAV 1200 for receipt into the interior volume 1100. For example, the UAV 1200 and associated wings 1202 may be rotated with the landing surface 1102 so that the wings 1202 do not impinge on side walls 1204 of the UAV pod 1000 (see FIG. 13) as the UAV 1200 and landing surface 1102 are translated down into the interior volume 1100 for protective storage. Similarly, in preparation for takeoff, the UAV 1200 may be oriented to account for crosswind during launch.

Methods of Agricultural Survey Use—Non-Contiguous Areas ("UAV Migration")

Figure 14:
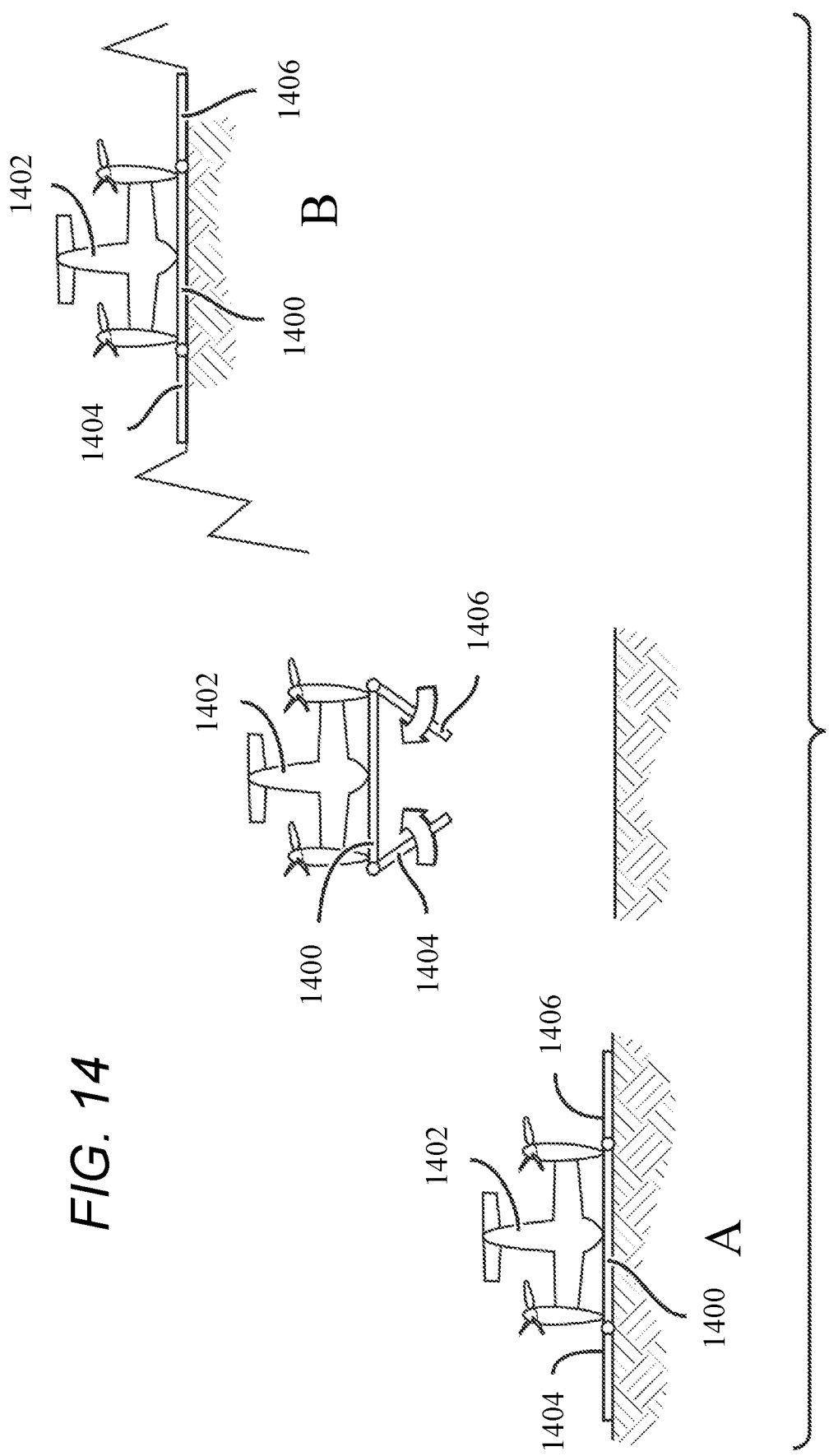
FIG. 14 depicts a system including a portable UAV pod that can be relocated and positioned by the UAV carrying it from a position "A" to position "B".

As shown in FIG. 14, in embodiments, the system may include a portable UAV pod 1400 that can be relocated and positioned by the UAV 1402 carrying it. The UAV pod 1400 is generally lighter and smaller than other UAV pods set forth herein so as to allow it to be carried by the UAV 1402. The weight and size of the pod 1400 could be reduced by any of a variety of means including having it lack doors to enclose the UAV 1402. Such a pod 1400 could be used as a way station for the UAV 1402 to stop at to recharge and extend its overall range. Also, by having the UAV pod 1400 being able to be positioned by the UAV 1402 would allow the pod 1400 to be placed in otherwise effectively inaccessible locations, such as on top of a mountain or on an island.

As shown in FIG. 14, the UAV 1402 starts on the pod 1400 in location A, where the UAV 1402 is physically attached to the pod 1400. Then the UAV 1402 takes off vertically with the pod 1400 to deliver it to a remote location B, at which the UAV 1402 can detach from the pod 1400 and leave it in place. To aid in its transport the UAV pod 1400 may have portions 1404 and 1406 that can fold up during transport and unfold prior to landing at the new location. The folding portions 1404 and 1406 could be solar panels to collect and power the pod 1400 and the UAV 1402. Positioning pods 1400 in this manner would allow for a tailoring of the geographic area that the UAV could cover. Such lighter less capable pods 1400 could work in conjunction with more functional fix position pods, such as those set forth herein as the pods 1400 would provide less functions (e.g., charging only) than the fixed pods (e.g., charging, data processing, data transmission, an enclosure for UAV protection, etc.).

In summary of the system disclosed herein, a VTOL UAV storage and launch system may include a UAV pod having a UAV pod processor, and a UAV selectively enclosed in the UAV pod, the UAV having only two rotors. The system may include a display on the UAV pod and/or a rearward facing tang extending from a rear fuselage portion of the UAV.

Another unmanned aerial vehicle (UAV) storage and launch system is disclosed that includes a UAV pod having a UAV pod processor and short-range UAV pod transceiver, a vertical takeoff and landing (VTOL) two-rotor UAV enclosed in the UAV pod, the two-rotor UAV having a UAV processor and a UAV transceiver, the UAV processor in communication with the UAV pod processor through the short-range UAV pod transceiver and the UAV transceiver. The UAV pod processor may be configured to provide mission instructions to the UAV processor and to monitor UAV trajectory information. The system may also include a proximity sensor coupled to the UAV pod, with the proximity sensor configured to detect the presence of an object positioned over the UAV pod, when an object is present. A weather sensor may also be included that is in communication with the UAV pod processor, and a UAV pod memory may be in communication with the UAV pod processor. In some configurations, the UAV pod memory is portable memory, such as a secure digital (SD) card, and the system may include a long-range UAV pod transceiver coupled to the UAV pod and in communication with the UAV pod processor, with the UAV pod processor further configured to monitor UAV pod external environmental conditions in response to information received from the weather sensor. The UAV pod processor may be further configured to provide reroute instructions to the two-rotor UAV, and the rerouting instructions may include instructions to return to the UAV pod for landing. In preferred embodiments a UAV pod cover is included that is operable to open and close.

A method of unmanned aerial vehicle (UAV) launch and control is also described that includes transmitting one of a plurality of missions to a two-rotor UAV seated in a UAV pod, launching the two-rotor UAV out of the UAV pod, monitoring a trajectory of the two-rotor UAV using a UAV pod transceiver in communication with a UAV pod processor, the UAV pod processor coupled to the UAV pod, and monitoring a battery status of the two-rotor UAV during flight. The method may also include providing re-routing instructions to the two-rotor UAV from the UAV pod and the re-routing instructions may include UAV instructions to return to the UAV pod for landing. In certain embodiments, the method may also include downloading geographic survey data from the two-rotor UAV to a UAV pod memory in communication with the UAV processor, and the UAV pod memory may be portable memory detachably connected to the UAV pod. In other embodiments, the method may include landing the two-rotor UAVs in the UAV pod, closing a UAV pod protective cover over the two-rotor UAV, downloading geographic survey data from the two-rotor UAV to a UAV pod memory in communication with the UAV processor, transmitting another one of a plurality of missions to the two-rotor UAV seated in the UAV pod, opening the protective cover, and launching the two-rotor UAV out of the UAV pod. The launch and control method may also include monitoring for overhead obstacles using a proximity sensor, monitoring the weather using a weather sensor, and transmitting the geographic survey data to an operations center disposed remote from the UAV pod.

Another unmanned aerial vehicle (UAV) storage and launch system is described that includes a UAV pod processor, and a UAV pod transceiver in communication with the UAV pod processor, the UAV pod processor configured to monitor a predetermined two-rotor UAV, when the two-rotor UAV is present, a two-rotor UAV trajectory, and a UAV battery status; and a UAV pod memory in communication with the UAV pod processor, the UAV pod memory storing a plurality of UAV missions that collectively provide a geographic survey of an area.

While various embodiments of the invention have been described, it will be apparent to those of ordinary skill in the art that many more embodiments and implementations are possible that are within the scope of this invention.

What is claimed is:

1. A method of migrating unmanned aerial vehicle (UAV) operations between geographic survey areas, comprising:
    launching, by a UAV from a first location, the UAV having a portable UAV pod, wherein the portable UAV pod is attached to the UAV at launch;
    flying, by the UAV, the UAV having the portable UAV pod to a second location;
    landing, by the UAV, the UAV having the portable UAV pod at the second location;
    detaching the UAV from the portable UAV pod; and
    launching the UAV from the portable UAV pod at the second location.

2. The method of migrating UAV operations between geographic survey areas of claim 1 wherein the portable UAV pod folds up during flight of the UAV and unfolds prior to landing.

3. The method of migrating UAV operations between geographic survey areas of claim 1 wherein the portable UAV pod does not have doors to enclose the UAV.

4. The method of migrating UAV operations between geographic survey areas of claim 1 further comprising:
    charging the UAV by the portable UAV pod.

5. The method of migrating UAV operations between geographic survey areas of claim 1 wherein landing the UAV having the portable UAV pod at the second location further comprises:
    positioning, by the UAV, the portable UAV pod at the second location.

6. The method of migrating UAV operations between geographic survey areas of claim 1 wherein the second location is on an island.

7. The method of migrating UAV operations between geographic survey areas of claim 1 wherein the second location is on top of a mountain.

8. The method of migrating UAV operations between geographic survey areas of claim 1 wherein the second location is an otherwise effectively inaccessible location.

9. The method of migrating UAV operations between geographic survey areas of claim 1 wherein the portable UAV pod is physically attached to the UAV at launch.

10. The method of migrating UAV operations between geographic survey areas of claim 1 wherein launching the UAV comprises a vertical takeoff of the UAV.

11. The method of migrating UAV operations between geographic survey areas of claim 1 wherein the UAV is a vertical takeoff and landing (VTOL) UAV.

12. The method of migrating UAV operations between geographic survey areas of claim 1 wherein the portable UAV pod comprises one or more folding portions.

13. The method of migrating UAV operations between geographic survey areas of claim 12 wherein the one or more folding portions comprise solar panels.

14. The method of migrating UAV operations between geographic survey areas of claim 13 further comprising:
    charging, by the solar panels, a UAV pod battery.

15. The method of migrating UAV operations between geographic survey areas of claim 12 further comprising:
    folding up the one or more folding portions during flight of the UAV.

16. The method of migrating UAV operations between geographic survey areas of claim 12 further comprising:
   unfolding the one or more folding portions prior to landing of the UAV.

17. The method of migrating UAV operations between geographic survey areas of claim 14 further comprising:
   charging, by the UAV pod battery, the UAV.

18. The method of migrating UAV operations between geographic survey areas of claim 1 further comprising:
   landing, by the UAV, the UAV at a fixed UAV pod at a third location.

19. The method of migrating UAV operations between geographic survey areas of claim 18 further comprising:
   enclosing, by the fixed UAV pod, the UAV within the fixed UAV pod.

20. The method of migrating UAV operations between geographic survey areas of claim 18 further comprising:
   transmitting data between the fixed UAV pod and the UAV.

21. The method of migrating UAV operations between geographic survey areas of claim 18 further comprising:
   charging the UAV by the fixed UAV pod.

* * * * *